(12) United States Patent
Townsend et al.

(10) Patent No.: US 7,770,126 B2
(45) Date of Patent: Aug. 3, 2010

(54) ASSISTING USER INTERFACE ELEMENT USE

(75) Inventors: Reed L. Townsend, Seattle, WA (US); Steven P. Dodge, Sammamish, WA (US); Bryan D. Scott, Bothell, WA (US); Alexander J. Kolmykov-Zotov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/351,380

(22) Filed: Feb. 10, 2006

(65) Prior Publication Data
US 2007/0192731 A1    Aug. 16, 2007

(51) Int. Cl.
*G06F 3/048* (2006.01)

(52) U.S. Cl. .................. 715/766; 715/764; 715/773

(58) Field of Classification Search .......... 715/788, 715/764, 766, 773; 345/157, 173
See application file for complete search history.

(56) References Cited

U.S. PATENT DOCUMENTS

| | | | | |
|---|---|---|---|---|
| 5,241,625 A * | 8/1993 | Epard et al. | 345/502 |
| 5,327,161 A * | 7/1994 | Logan et al. | 345/157 |
| 5,430,839 A * | 7/1995 | Jagannathan et al. | 715/802 |
| 5,483,261 A * | 1/1996 | Yasutake | 345/173 |
| 5,577,188 A * | 11/1996 | Zhu | 715/745 |
| 5,583,974 A * | 12/1996 | Winner et al. | 345/422 |
| 5,627,959 A * | 5/1997 | Brown et al. | 715/853 |
| 5,798,752 A * | 8/1998 | Buxton et al. | 715/863 |
| 5,859,639 A * | 1/1999 | Ebrahim | 715/788 |
| 6,016,137 A * | 1/2000 | Evans et al. | 715/861 |
| 6,202,212 B1 * | 3/2001 | Sturgeon et al. | 725/141 |
| 6,337,701 B1 * | 1/2002 | Jones | 715/856 |
| 6,411,283 B1 * | 6/2002 | Murphy | 345/173 |
| 7,343,566 B1 * | 3/2008 | Chaudhri et al. | 715/781 |
| 2003/0016253 A1 * | 1/2003 | Aoki et al. | 345/863 |
| 2004/0119744 A1 * | 6/2004 | Chan | 345/763 |
| 2005/0134578 A1 * | 6/2005 | Chambers et al. | 345/184 |
| 2006/0132460 A1 * | 6/2006 | Kolmykov-Zotov et al. | 345/173 |
| 2007/0033543 A1 * | 2/2007 | Ngari et al. | 715/788 |
| 2008/0012827 A1 * | 1/2008 | Ryu et al. | 345/158 |

\* cited by examiner

*Primary Examiner*—William L Bashore
*Assistant Examiner*—Gregory A DiStefano
(74) *Attorney, Agent, or Firm*—Woodcock Washburn LLP

(57) ABSTRACT

Methods of controlling the display and use of a UI element are disclosed. In an embodiment, the UI element may configured so that it initially maintains a topmost position but eventually allows other applications to assume the topmost position. In an embodiment, the display of the UI element may be adjusted in response to an input so that the UI element is not visible on the display. In an embodiment, the use of the UI element may allow for seamless dragging of the UI element even if the user inadvertently fails to make consistent contact with the touch-sensitive display while dragging the UI element.

19 Claims, 12 Drawing Sheets

ASSISTING USER INTERFACE ELEMENT USE

BACKGROUND

Touch-sensitive surfaces are becoming common in computing devices. They are convenient as they allow a user to make natural gestures familiar to the user in other contexts, such as by entering handwriting using a special stylus such as an elongated pen-like object having a pointed tip. Many of these devices also allow input to be provided by user's fingertip. The term touch-sensitive surface or device will be used herein to refer to such surfaces or devices that are configured to detect the touch of one or more types of "stylus" such as a specially-design stylus device and/or a user's finger. One disadvantage of using a finger or other broad-tipped stylus with a touch-sensitive device is that it is more difficult to accurately target where the finger will and will not touch, usually because the fingertip is typically larger than the area being targeted, and because the user cannot see through the fingertip to verify accurate targeting. For instance, where the touch-sensitive device is combined with a display (thus, a touch-sensitive display), it is difficult to use a finger to target small displayed objects so that they may be selected and/or manipulated.

One method of addressing this problem is to provide a user interface (UI) element. UI elements are graphical depictions adjacent or surrounding a cursor such as a mouse pointer. By placing a finger on the area represented by the UI element and dragging, the user may manipulate the pointer in a more precise manner then is possible with a relatively blunt finger. While the UI element provides a number of advantages, it can be a challenge to determine how the UI element should be displayed so as to not interfere with other information or the interaction with other nearby targets displayed on the screen.

A further challenge with using a stylus (which, as noted above, may be a finger) is that the user may not provide a consistent pressure when attempting to provide a drag input on the touch-sensitive surface. If the individual accidentally ceases to make contact during while providing the drag input, the affect can be an input different than what was intended or desired.

SUMMARY

Methods of controlling the display of a UI element are disclosed. The UI element may be configured as desired and may be initially positioned in a topmost position. This position may be maintained for a period of time even if other applications attempt to shift the UI element from the topmost position. The display of the UI element may also be adjusted by an input provided by an application or by an input provided by a user through a control panel or the like. Depending on the configuration, the display of the UI element may be adjusted so that the UI element becomes partially or completely transparent, larger or smaller. In some implementations the user may be allowed to choose among multiple widgets having distinct appearance and/or interaction models, and the selection may be implemented system-wide or on an application by application basis.

In addition, methods of processing an inadvertent break in a drag input are disclosed. If a first drag input ends and a second drag input starts in a location that is consistent with an extended first drag input, the first and second drag inputs may be combined. Characteristics of the first and second drag inputs may be compared to determine whether the first and second drag inputs should be combined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Computing Environment

Figure 1:
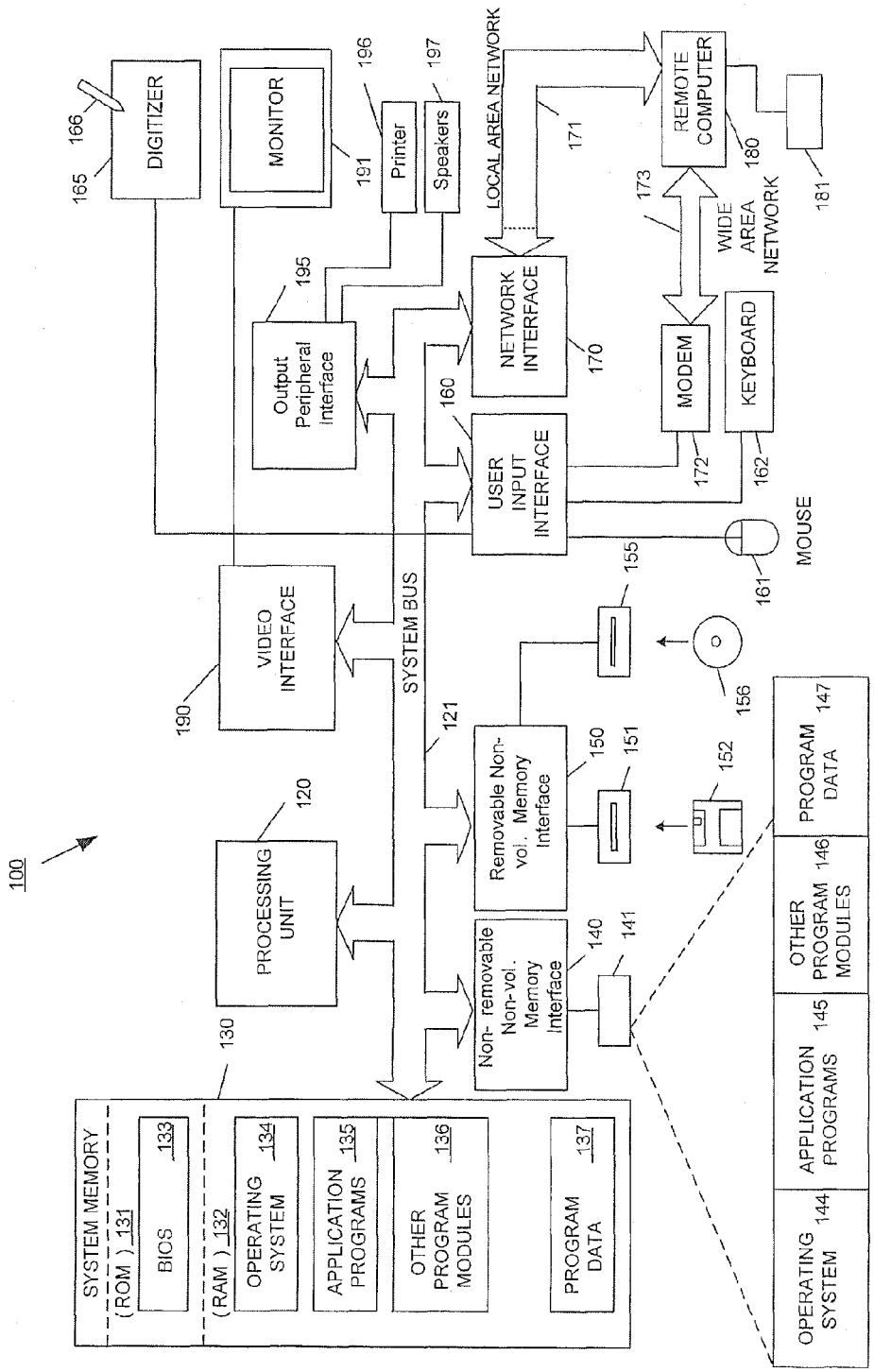
FIG. 1 illustrates a schematic diagram of an exemplary general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Data stored on any of the various computer storage media may be stored in a variety of formats. For example, data may be stored as discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a touch-sensitive device (e.g., digitizer) 165, or a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

A touch-sensitive device 165, which may have an accompanying stylus 166, is provided in order to digitally capture freehand input. Although a direct connection between the touch-sensitive device 165 and the user input interface 160 is shown, in practice, the touch-sensitive device 165 may be coupled to the processing unit 120 directly, via parallel port or another interface, or via the system bus 121 by any technique, either wired or wirelessly. User input to the touch-sensitive device 165 may be in the form of touch input (i.e., where an object such as the stylus 166, a user's finger, or another type of stylus, physically contacts the touch-sensitive surface of the touch-sensitive device 165). The term "stylus" is used broadly herein to include the human finger or other body parts as well as man-made objects that may be used for providing input to the touch-sensitive device 165. Input to the touch-sensitive device 165 may also be in the form of hover input, where the stylus does not touch the touch-sensitive surface but is sensed to be proximate to the touch-sensitive surface. Thus, the touch-sensitive device 165 may be configured to detect touch input (such as tapping or dragging gestures physically made on the touch-sensitive surface) and/or hover input (such as in-air gestures made near the touch-sensitive surface). The touch-sensitive device 165 may be separate from the display device (e.g., monitor 191) or may be integrated with a display device, such that the surface that is touch-sensitive is also a display. In the latter case, such a device is referred to as a touch-sensitive display. Touch-sensitive displays, and indeed touch-sensitive devices, are well known. Touch-sensitive displays are also known where the digitizer is positioned in a pouch behind a display portion, which in turn is protected by a clear acrylic sheet. Alternatively, the touch-sensitive digitizer may transparent and is integrated with the acrylic sheet, with the display portion being behind the digitizer. In both cases, the digitizer and the display portion may be separate physical components but packaged together in a manner that effectively acts as a single unit. Conventional tablet-style computers use these types of touch-sensitive displays.

The touch-sensitive device 165 may further be integrated with the entirety of the computer 100, packaged as a single unit. For example, the computer 100 may be a portable laptop computer where the integrated display is a touch-sensitive display. Or, the computer 100 may be a portable tablet-style computer where the integrated display is a touch-sensitive display. Again, such single-unit computers with integrated touch-sensitive displays are well known. In addition, the touch-sensitive device may be incorporated into a stand-alone monitor such as is found in desktop computers or other applications where a touch-sensitive display may be useful.

The computer 100 may operate in a networked environment using logical connections to one or more remote computers, such as a remote computer 180. The remote computer 180 may be a personal computer (such as a desktop computer, a laptop computer, or a tablet-style computer), a handheld computer (e.g., a personal digital assistant), a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be BLUETOOTH, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

Figure 2:
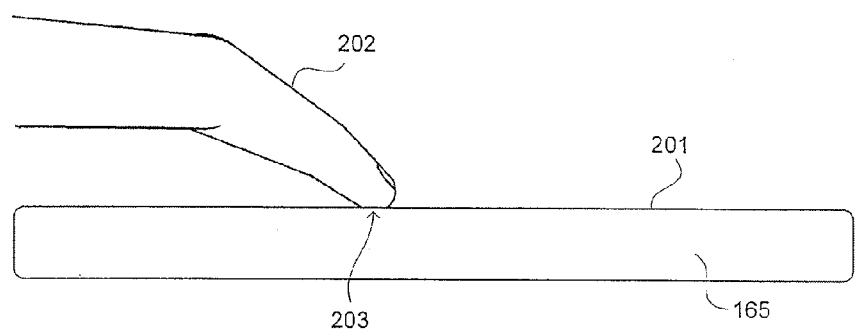
FIG. 2 illustrates a side view showing a user's finger touching a touch-sensitive display surface of a touch-sensitive device, in accordance with at least one aspect of the present invention.

Referring to FIG. 2, the touch-sensitive device 165 may have a touch-sensitive display 201 (or a non-display touch-sensitive surface). With such a configuration, the user may apply a stylus such as stylus 166 or the user's own finger 202 to provide input to the touch-sensitive display 201, and the user may be able to view feedback to the input displayed on the touch-sensitive display 201. It should be noted that different hardware may be used to digitize the touch, such as, but not limited to, resistive and capacitive digitizers. Where the input is touch input, a contact area 203 may occur between the user's finger 203 and the touch-sensitive surface 201. While the remainder of this disclosure will discuss aspects of the invention interacting with input by a user's finger, as the invention is especially useful in such a situation, it should be understood that the invention may be used with any type of stylus assuming the stylus is compatible with the touch digitizer hardware used.

Figure 3:
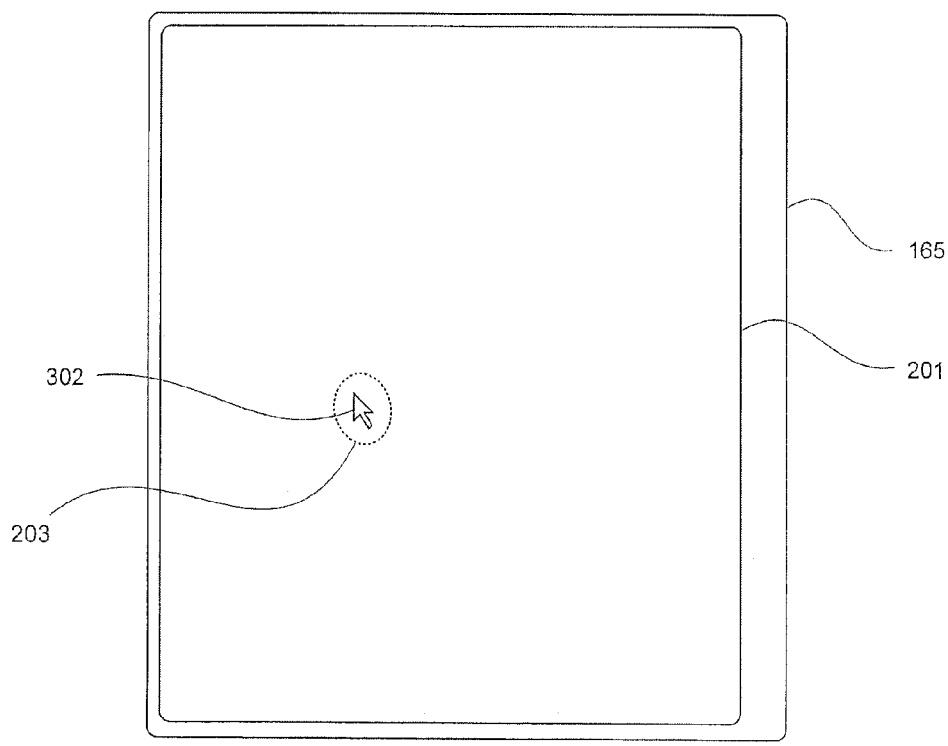
FIG. 3 illustrates a plan view of the touch-sensitive device of FIG. 2, in accordance with at least one aspect of the present invention.

Referring to FIG. 3, the touch-sensitive display 201 may display a cursor 302, which is a displayed control that is movable about the touch-sensitive display 201 and used to indicate where the user intends to send an event. In tablet-style computers, for example, it is common for the cursor 302 to be controlled in accordance with the position of the stylus, such that the cursor 302 is located directly under the stylus. The user may typically make a gesture, such as a tap gesture, onto the touch-sensitive display 201, in order to emulate a left mouse button down (also known as a left click) or a right mouse button down (also known as a right click). The left and right mouse button down events (which may be followed by a left or right mouse button up event, or not) are well known to many operating systems, such as Microsoft brand WINDOWS operating systems, as well as to many software applications. Where a right click is not supported or where additional features are desired, other behaviors (such as shortcut access) may be provided in place of or in addition to a right click. Although the cursor 302 is shown as a familiar arrow-style cursor, the cursor 302 may be any shape such as a point or a hand. Also, the shape of the cursor 302 may change depending upon the displayed location of the cursor 302 in relation to other displayed features and/or the status of an application or the operating system running on the computer 100.

As can be seen in FIG. 3, the size of contact area 203 may be on the order of, or substantially larger than, the cursor 302 itself. Regardless of the relative size of the cursor 302, the contact area 203 may be expected to be larger than a few pixels on the touch-sensitive display 201, due to the natural size of the human fingertip. For example, the contact area 203 may be on the order of about a quarter of a square inch, and may be about a half inch in width and/or length. Of course, the contact area 203 may be smaller or larger depending upon the size of the user's finger or other stylus being used. In any event, the contact area 203 may be sufficiently large so as to effectively block the user from being able to see the displayed cursor 302 and/or anything displayed under or very near the cursor 302 such as a change in the shape of the cursor 302 from the depicted pointer to an I-beam, hand or hourglass, just to name a few possible shapes.

Accordingly, aspects of the present invention may allow the user to control the cursor 302 without having to contact the touch-sensitive display over the cursor 302. Instead, the user may apply a touch input to a location away from the cursor 302 so that the user may more easily see the cursor 302 and/or what it being displayed under or near the cursor 302. This may allow the user to more effectively and accurately control the location of the cursor 302. The user may need to touch a location sufficiently close to the cursor 302 to ensure that this is what the user intended, and indeed the touch may need to be so close that the user likely would not even realize that the user is not applying touch directly on the cursor 302 itself. In addition, the user may be able to funnel an event to the location of the cursor 302 even though the user is providing input triggering the event at a location away from the cursor 302. Funneling as used herein refers to the concept of treating a touch that is provided within a predetermined range of the cursor as being applied on top of the cursor. In an embodiment, the user may accurately position the cursor 302 and then tap near the cursor 302 and the tap will be funneled to the cursor 302 so as to perform the desired action, which may be, for example, the selection of a button displayed on the screen. As can be appreciated, this may allow the user to more effectively and accurately control where an event, such as a left or right mouse button down event, is sent.

Figure 4A:
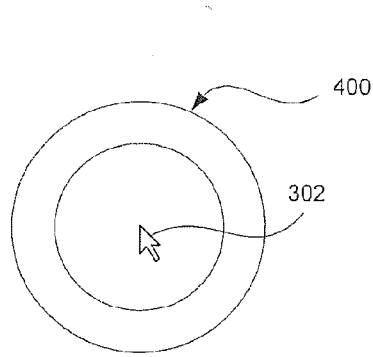
FIGS. 4a-4e illustrate embodiments of UI elements in accordance with at least one aspect of the present invention.
Figure 4B:
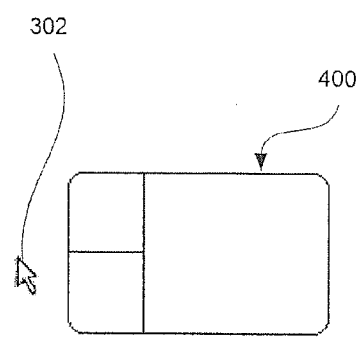
Figure 4C:
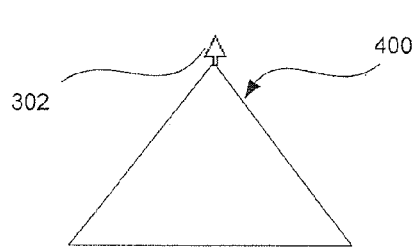
Figure 4D:
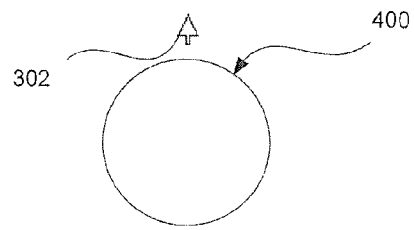
Figure 4E:
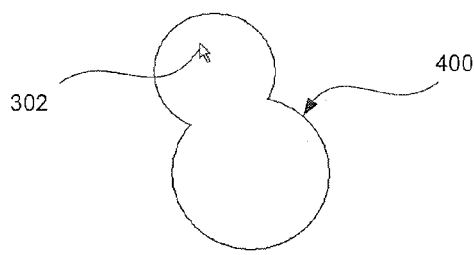

FIGS. 4a-4e illustrate embodiments of exemplary graphical depictions that may be used as a UI element. In FIGS. 4a and 4e the UI element 400 surrounds the cursor 302. In FIGS. 4b-4d the UI element 400 is adjacent the cursor 302. It should be noted that numerous other variations are possible and therefore the depicted UI elements are merely representative of a few of the possible variations.

Figure 5:
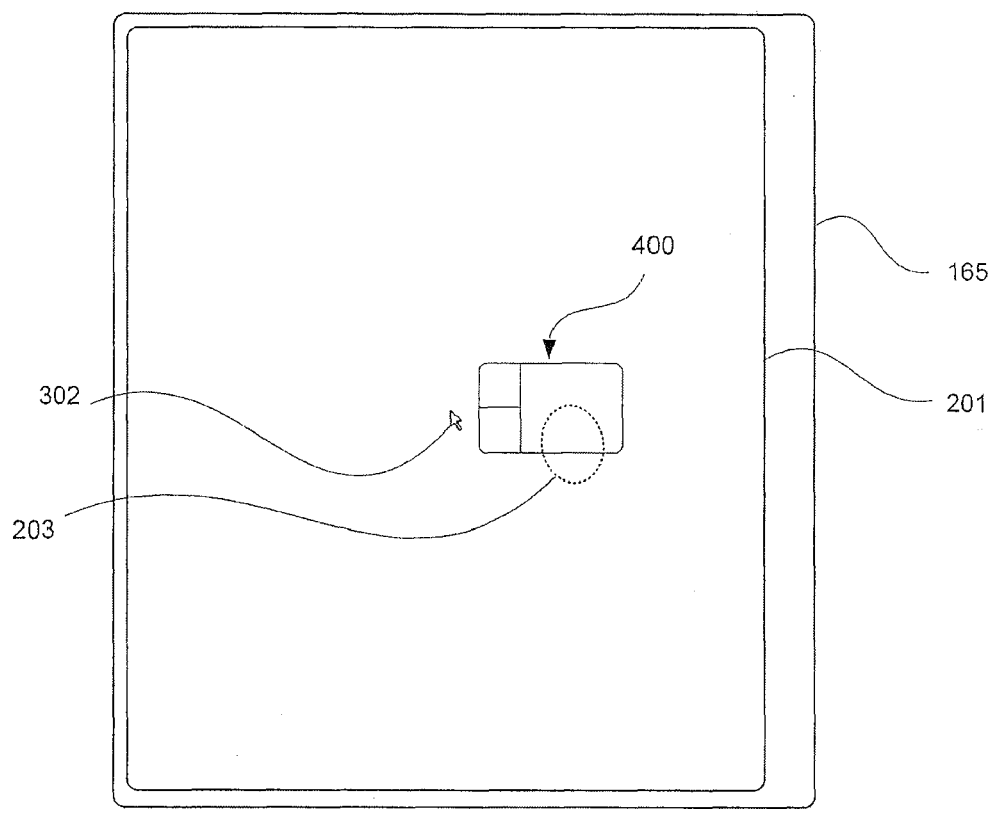
FIG. 5 illustrates an embodiment of a UI element in accordance with at least one aspect of the present invention.

FIG. 5 illustrates how a user may use the UI element 400. The user makes contact 203 with the UI element 400 on the touch-sensitive display 201, which is part of a touch-sensitive device 165. As can be appreciated, the UI element 400 depicted in FIG. 5 resembles a conventional mouse. While other UI element designs may provide improved interface, an advantage of such a conventional shape such as the mouse is that it is more intuitive for the user as most users are familiar with using a mouse to move a cursor. The user may also press the simulated left and right button so as to provide the equivalent of a right or left button press on a mouse.

Figure 6A:
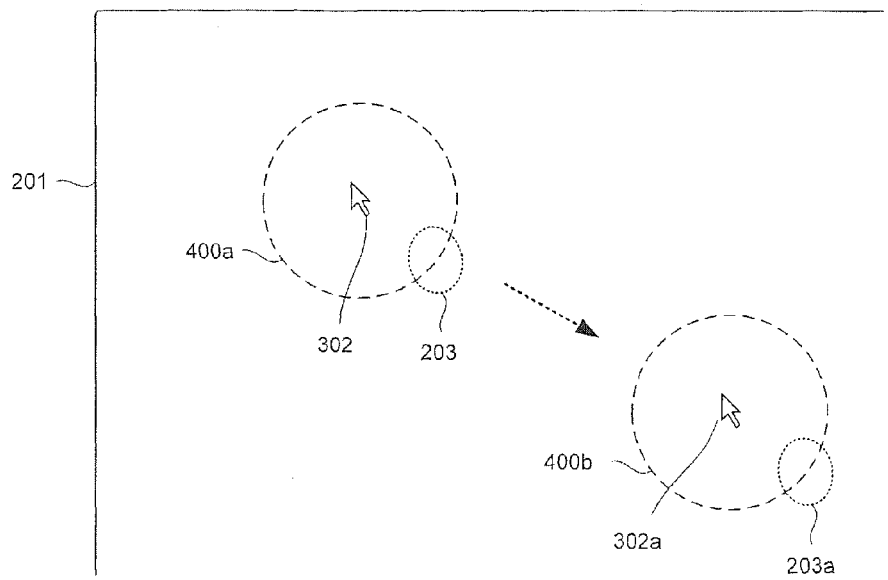
FIGS. 6a-6b illustrate an embodiment of moving a UI element across a display in accordance with at least one aspect of the present invention.
Figure 6B:
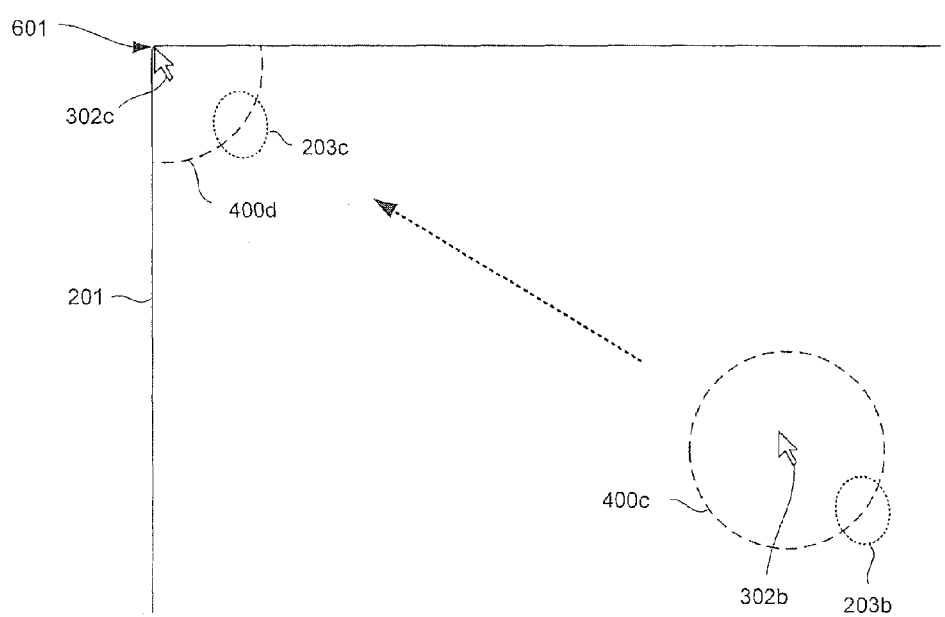

FIGS. 6a and 6b illustrate moving a cursor with a transparent UI element 400 (shown in dotted line for the sake of illustration) by dragging a contact 203 to a contact 203a and dragging a contact 203b to a contact 203c. This type of input may also be referred to as a drag input. As can be appreciated, the advantage of using a transparent UI element is that the UI element does not occlude other graphical depictions on the screen. In an embodiment, the UI element 400 may be completely transparent. In alternative embodiments, the UI element 400 may be partially or semi-transparent. Thus, the term transparent refers to both partially and completely transparent. As will be discussed in greater detail below, if the UI element 400 is completely transparent then the UI element 400 can maintain a topmost position without interfering with what is displayed on the touch-sensitive display 201.

It should be noted that the UI element 400 in FIGS. 6a and 6b is circular in shape and surrounds the cursor 302, even though it is at least partially transparent. One advantage to such a shape is that the user can readily use the UI element 400 to position the cursor 302c adjacent a corner 607, as depicted in FIG. 6b. In addition, as long as the contact 203 is within the predetermined range of the cursor 302 (e.g. on the UI element 400), the UI element 400 can be used to manipulate the cursor 302.

Figure 7A:
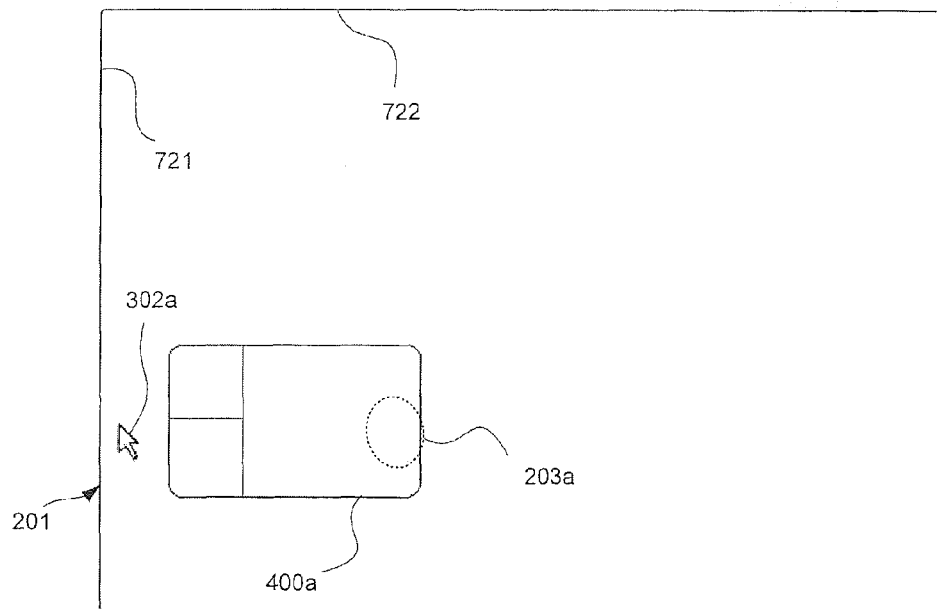
FIG. 7 illustrates an alternative embodiment of moving a UI element across a display in accordance with at least one aspect of the present invention.
Figure 7B:
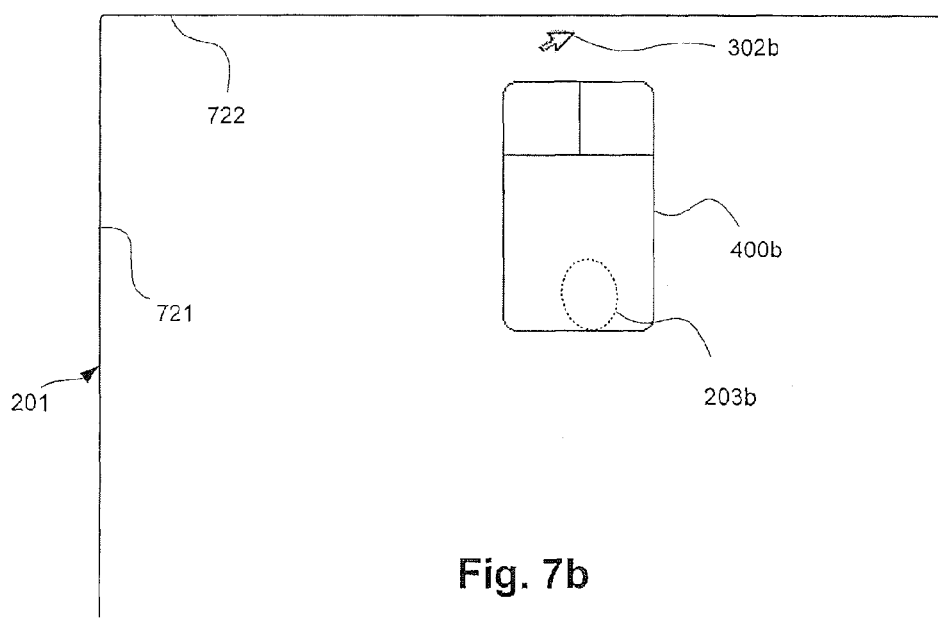

Looking now at FIG. 7a, a UI element 400 with a conventional shape resembling a mouse is depicted as being adjacent the cursor 302a. It should be noted that as used herein, adjacent includes touching and being relatively close to an object. The cursor 302a is positioned adjacent a first edge 721 of the touch sensitive display 201. As can be appreciated, however, the alignment between the UI element 400a and the cursor 302a would make it difficult for the user to move the cursor 302a close to a second edge 722 with the UI element 400a. To address this issue, in an embodiment the cursor and UI element may be configured to rotate with respect to each other so that as the cursor 302b is brought close to the edge 722 the UI element 400b rotates as depicted. While numerous methods of controlling the rotation are possible, in an embodiment the rotation may be related to the position of the cursor and the center of the display. In such an embodiment, moving the cursor 302 about the touch sensitive display 201 will cause the orientation of the cursor 302 and UI element 400 to rotate so that the UI element 400 is always substantially between the cursor 302 and the center of the touch-sensitive display.

Figure 8A:
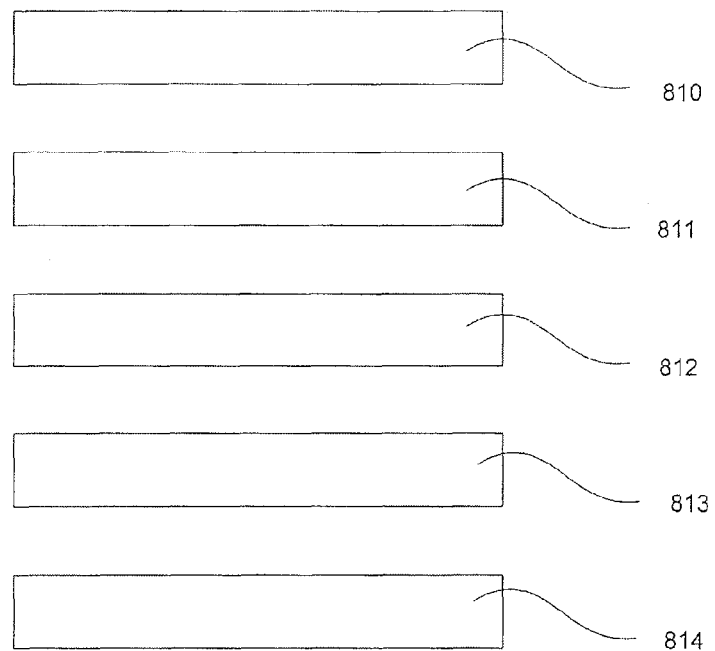
FIG. 8 illustrates a representation of positions that graphics may occupy while being displayed on the display in accordance with at least one aspect of the present invention.
Figure 8B:
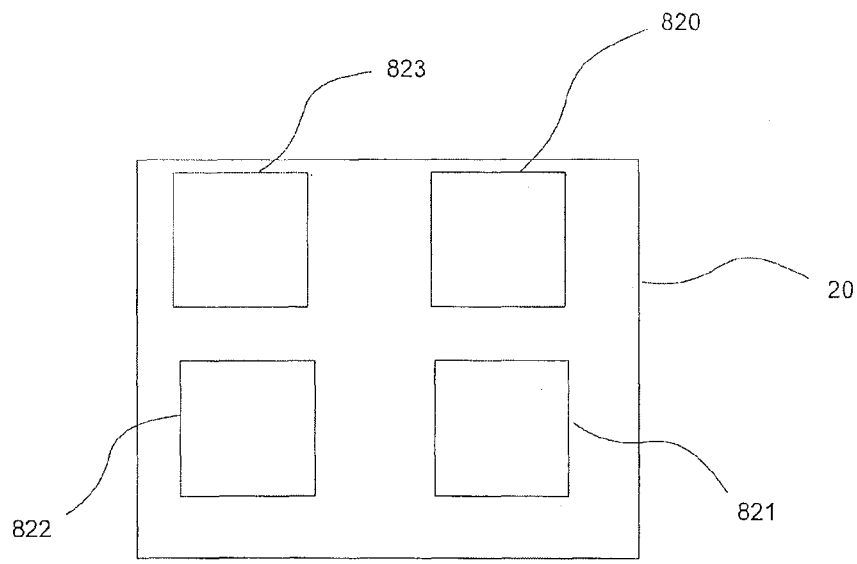

Turning to FIG. 8a, a set of positions of graphics are depicted. As can be appreciated, if something in the topmost position 810 is displayed on a location of a display, than anything on the display in that same location in a lower position 811-814 does not need to be displayed on the display. For example, referring to FIG. 8b, if multiple objects were located in area 820, then only the topmost object would need to be displayed. However, if objects were located around the screen such as in areas 820-823, then all the objects would need to be displayed even though the object in the topmost position might be the object located in area 820. In other words, if the topmost object covers the entire display then there is no need to display objects provided in lower positions. However, if the topmost object only partially covers the display then objects situated in lower positions also need to be displayed, to the extent they are not covered by an object in a higher position.

While this practice is known, typically the cursor 302 is configured so that it is always on top regardless of what applications might be active. Thus, the cursor 302 may be configured so as to be the only object that can be positioned in the topmost position and all other applications will positioned in lower positions. Referring to FIG. 8, if position 810 was reserved for the cursor then in practice, then position 811 would be considered the topmost position. While it is typically acceptable for the cursor 302 to always be in the topmost position because of its relatively small size, having the UI element permanently in the topmost position may be problematic because the UI element's potentially greater size may interfere with the users' ability to see what is on the display.

In one embodiment, the user may set the UI element 400 so that it is not displayed but still functions as normal (e.g. is completely transparent). As can be appreciated, this option works well for users that are comfortable with the use of the UI element 400 and are relatively familiar with its shape and functions. This approach works best with simple and uniform UI element models, such as the "ring" depicted in FIG. 4a.

Alternatively, methods of controlling the display of the UI element may be provided. As applications, depending on the nature of the application, may repeatedly try to position themselves in the topmost position, introducing a UI element with similar functionality could potential exacerbate this situation. Therefore, the display of the UI element may controlled so that the UI element only attempts to position itself in the topmost position initially but after a certain number of attempts or with the passage of time the UI element ceases to attempt to obtain the topmost position. Alternatively, the UI element can interface with the other applications and or the operating software through an API that allows the UI element and the applications to determine the appropriate position without the need to repeatedly reposition themselves. For example, the UI element could indicate that it required topmost position so that any application that was run would automatically start in a position below the topmost position. As can be appreciated, this requires additional processing when deciding where to position an application or the widget but reduces the processing required to adjust the position of applications and/or the UI element that become positioned in non-preferred positions because of the actions of other applications.

Figure 9:
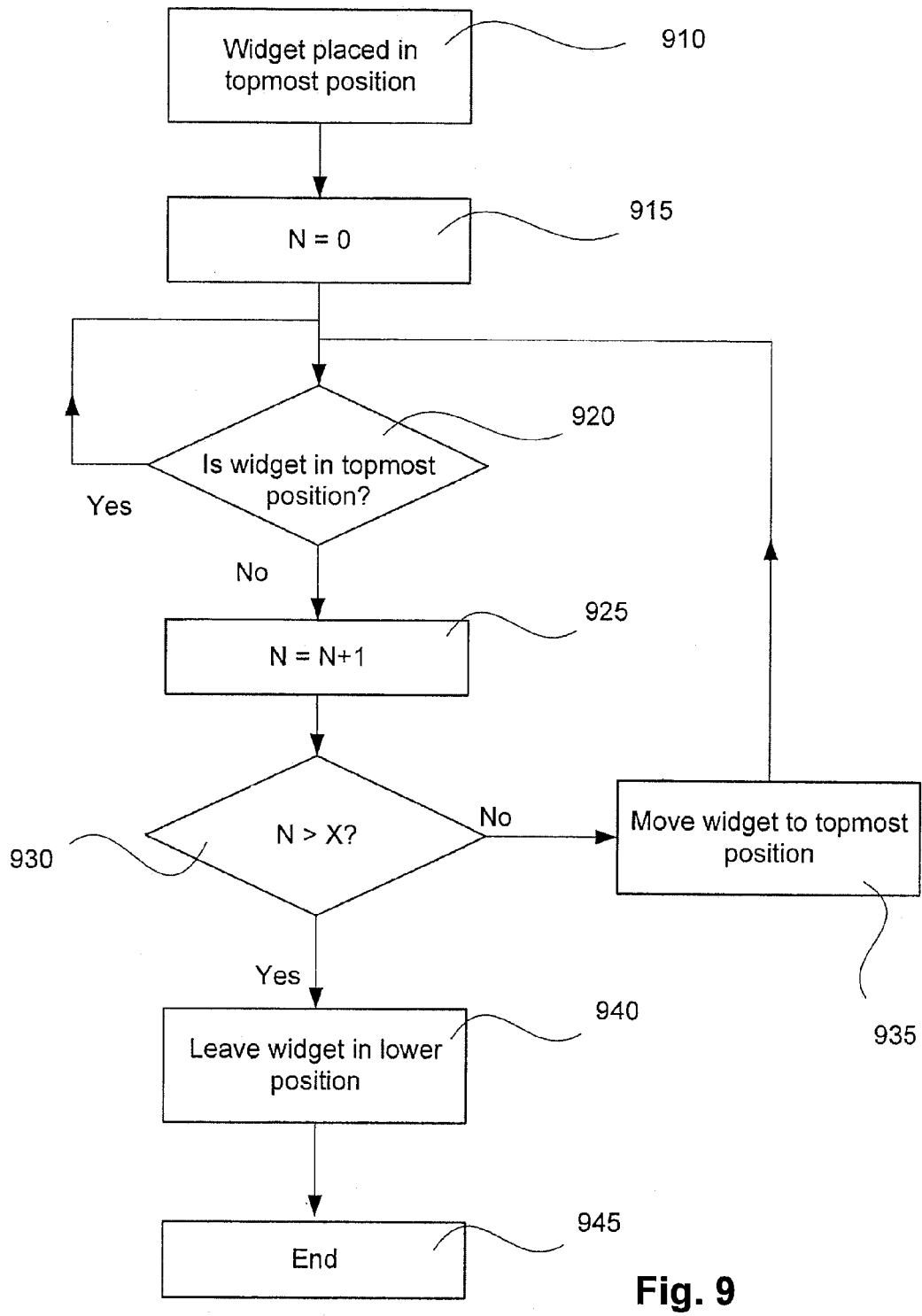
FIG. 9 illustrates an exemplary method of controlling the display of a UI element that may be used in accordance with at least one aspect of the present invention.

An alternative method of addressing the issue of controlling the display of a UI element is depicted in FIG. 9. In step 910, the UI element is placed in the topmost position available, which may be position 810 if it is not reserved for the cursor. This may include shifting other applications that were previously in topmost position down one position. In step 915, a counter is set to zero. Next in step 920 a check is made to see if the UI element is in the topmost position. This may involve a check to see what position the UI element is in or may include a check to see what is in the topmost position.

If the UI element is still in the topmost position then step 920 is repeated. If another application has shift the UI element down so that the application can occupy the topmost position, then in step 925 the counter N is incremented. Next in step 930 a check is made to see if the counter N exceeds some predetermined value. If the counter N does not exceed some predetermined value X, then in step 935 the UI element is moved back to the topmost position. This may involve shifting any applications that were in the topmost application downward. Step 920 would then be repeated.

However, if the counter N did exceed some predetermined value X, then in step 940 the UI element would be left in the lower position and in step 945 the method would end.

As can be appreciated, such a method allows a UI element to continue to attempt to obtain the topmost position but if an application is persistent enough then the UI element allows the application to take the topmost position. This would prevent a continuous battle between the UI element and some application that both were configured to maintain a topmost position.

It should be noted that the value of X might vary depending on the type of application. Thus, for application that was intended to maintain a topmost position in a certain mode, such as a presentation mode, the value of X could be set to be zero or 1. However, a greater value for X could be used if a delay was desired before the UI element was shifted from the topmost position.

Figure 10:
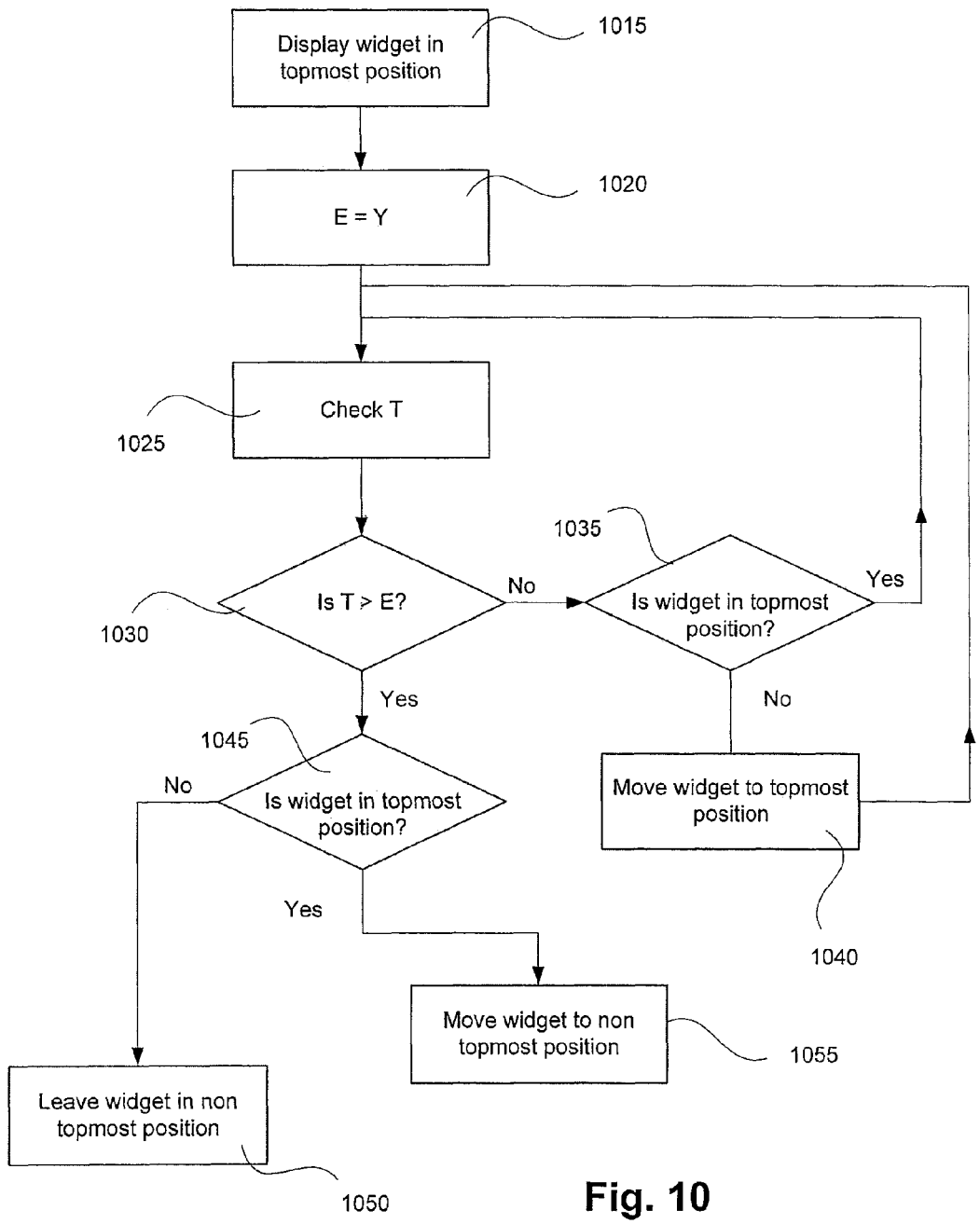
FIG. 10 illustrates an alternative exemplary method of controlling the display of a UI element that may be used in accordance with at least one aspect of the present invention.

FIG. 10 illustrate another alternative embodiment for controlling the display of a UI element on the display. First in step 1015, the UI element is displayed in a topmost position. As previously noted, this may be the topmost position 810 or 811, depending on whether a position is reserved for the cursor. Next in step 1020, E is set equal to some time Y, which may represent the current time plus some constant such as 2 or 5 seconds. It should be noted that the constant may be configurable and may be user adjustable. Next in step 1025, a check of what the current time T is. Then in step 1030, a check is made to see if the current time T is greater then the time that E has been set to. If the current T is not greater than the preset time E, then in step 1035 a check is made to see if the UI element is in the topmost position. If the UI element is in the topmost position, step 1025 is repeated. If the UI element is not in the topmost position, then in step 1040 the UI element is moved to the topmost position and then step 1025 is repeated.

This process is repeated until the current time T exceeds the predetermined ending time E. Once T is greater then E, in step 1045 a check is made to see if the UI element is in the topmost position. If the UI element is not in the topmost position, then in step 1050 the UI element is left in the position it is currently occupying. If the UI element is in the topmost position, then in step 1055 the UI element is shifted to a position below the topmost position.

As can be appreciated, the above steps can take place a number of times per second. Therefore, the UI element can be set so as to stay visible for a predetermined period of time and then become non-visible assuming there are other applications that are active.

Alternatively, the UI element may be configured to be become partially or completely transparent. In such an embodiment, the UI element could initially be in a completely occluding state and after a period of time become transparent. As can be appreciated, the final transparent state may be completely transparent or partially transparent. Furthermore, the transition could be in stages so that the UI element becomes more transparent over time. In at least one other alternative embodiment, the display of the UI element may be completely disabled until some application or user based input reactivates the display of the UI element.

It should be noted that user based inputs related to the display of the UI element may be provided by changing settings in a control panel. Thus, the user could change the shape of the UI element, could change how the UI element displayed (e.g. the transparency or color) and could even change whether the UI element was displayed at all. In addition, these user input-based changes could be made on an application-by-application basis or could be applied more globally across a suite of applications or even all applications.

It should be noted that in an embodiment, the methods depicted in FIGS. 9 and 10 may be applied to a UI element that is not being used by the user. In such an embodiment, while the UI element is in use it would stay visible. Thus, in an embodiment, the change in how the UI element was displayed could occur after a period of inactivity.

Figure 11:
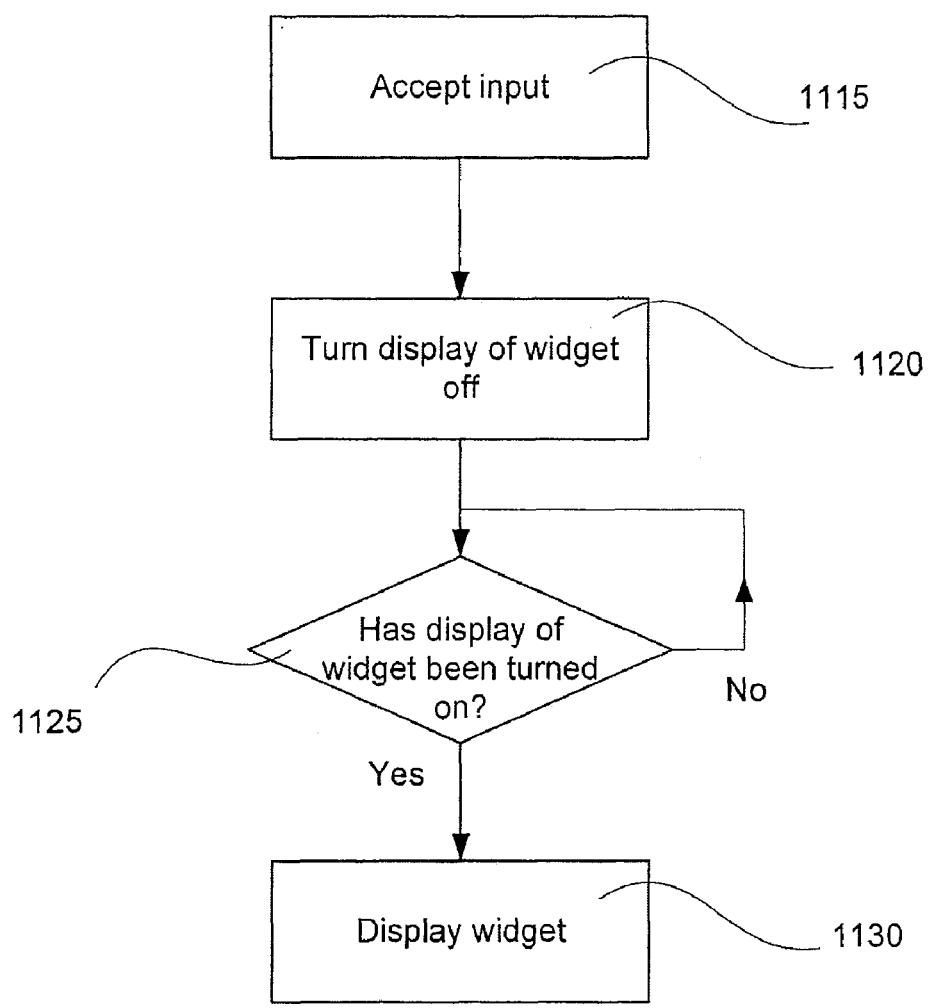
FIG. 11 illustrates another exemplary method of controlling the display of a UI element that may be used in accordance with at least one aspect of the present invention.

FIG. 11 illustrates an alternative embodiment for controlling the display of the UI element. First in step 1115, an input is accepted. The input may be provided by an application changing modes such as PowerPoint when entering a presentation mode. In addition, if the cursor is hidden then it may also be useful to hide the UI element. The input may also be provided by a user providing input with an external mouse or keyboard or some other input device other than the touch-sensitive display. The input may also be provided by the user switching off the UI element display functionality. Next in step 1120 the display of the UI element is turned off. In at least some embodiments, the UI element feature may be deactivated. In at least some other embodiments, the display of the UI element may be set to completely transparent or the UI element may be placed in a lower position.

Next in step 1125 a check is made to see if the display of the UI element is turned back on. This may be provided by, for example but without limitation, an application changing modes, a user activating the display of the UI element, a period of delay after a previous input and a contact on the touch-sensitive display. If the UI element is turned back on, then in step 1130 the display of the UI element is adjusted so that it is visible again. Alternatively, the check step in 1125 may be omitted and the UI element may stay off until some step is taken by an application or a user.

Figure 12:
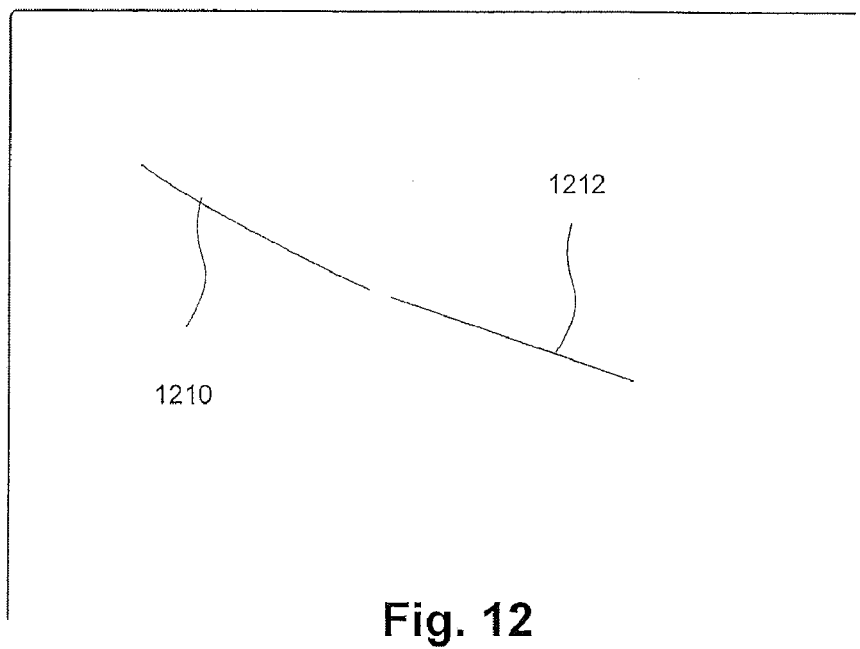
FIGS. 12-13 illustrate drag inputs that may be processed in accordance with at least one aspect of the present invention.
Figure 13:
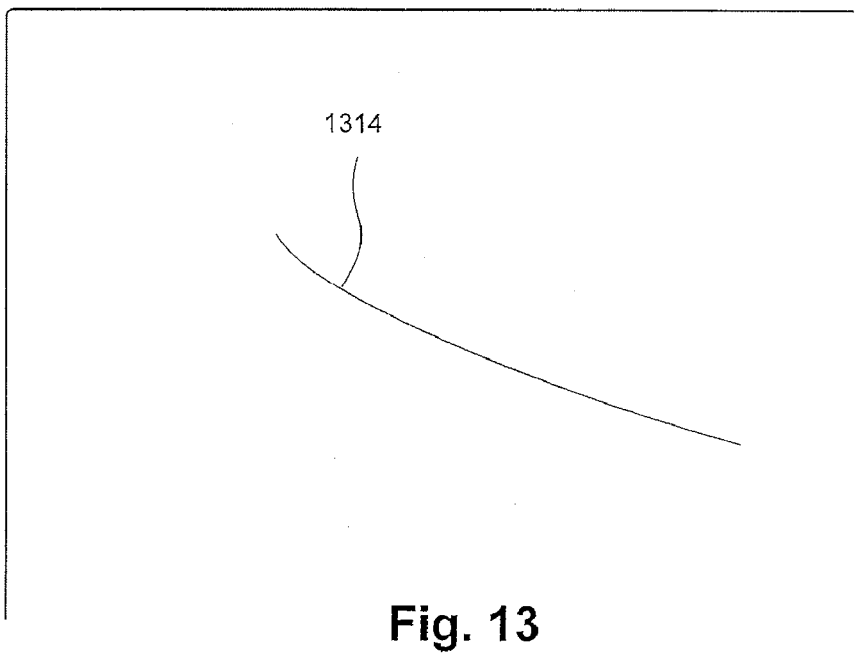

As can be appreciated, the UI element allows the user to manipulate the cursor with greater precision. If desired, the user may drag the UI element in a desired direction so as to cause the cursor to move, such was depicted in FIGS. 6*a* and 6*b*. Occasionally, however, the user may inadvertently fail to maintain the necessary contact with the touch-sensitive display during the process of providing the drag input. In such as case, as depicted in FIG. 12, a drag input 1210 and a drag input 1212 will be detected while the user intended to provide a drag input similar to a drag input 1314 as depicted in FIG. 13. As can be appreciated from FIG. 12, the drag input 1210 ends and drag input 1212 picks up a short distance away and both drag inputs 1210, 1212 are moving in about the same direction. However, depending on what the user is doing, ending the drag input 1210 and the starting of the drag input 1212 may be undesirable because the user intended to make one single drag input 1314 as depicted in FIG. 13.

Therefore, in an embodiment, characteristics of the drag input 1212 may be compared to the characteristics of the drag input 1210. If the characteristics of the drag input 1212 are similar to the characteristics of the drag input 1210 then it may be determined that the two drag inputs 1210 and 1212 were intended to be the single drag input 1314.

As can be appreciated, different characteristics may be used to determine whether the second drag input 1212 matches the first drag input 1210. In an embodiment the angle of movement of the drag input 1210 may be compared to the angle of movement of the drag input 1212. In addition, the distance between the end of the drag input 1210 and the drag input 1212 may also used to ensure the distance is not too large. Other characteristics that may be used include the velocity of the drag input 1210. For example, if the drag input 1210 and the drag input 1212 are intended to be the single drag input 1314 then drag input 1212 is expected to resemble an extended drag input 1210 within a range of angles. Therefore, if the drag input 1212 starts at a location that is consistent with where the drag input 1210 would be if the drag input 1210 had not ended, the drag input 1210 and 1212 may be considered to be intended to be the single drag input 1314.

In addition, Fitt's law or the Accot-Zhai steering law may also be used to determine whether the characteristics of the drag input 1212 match the characteristics of the drag input 1210. If the two drag inputs 1210, 1212 are close enough, the drag inputs 1210 and 1212 may be combined to form the single drag input 1314.

Figure 14:
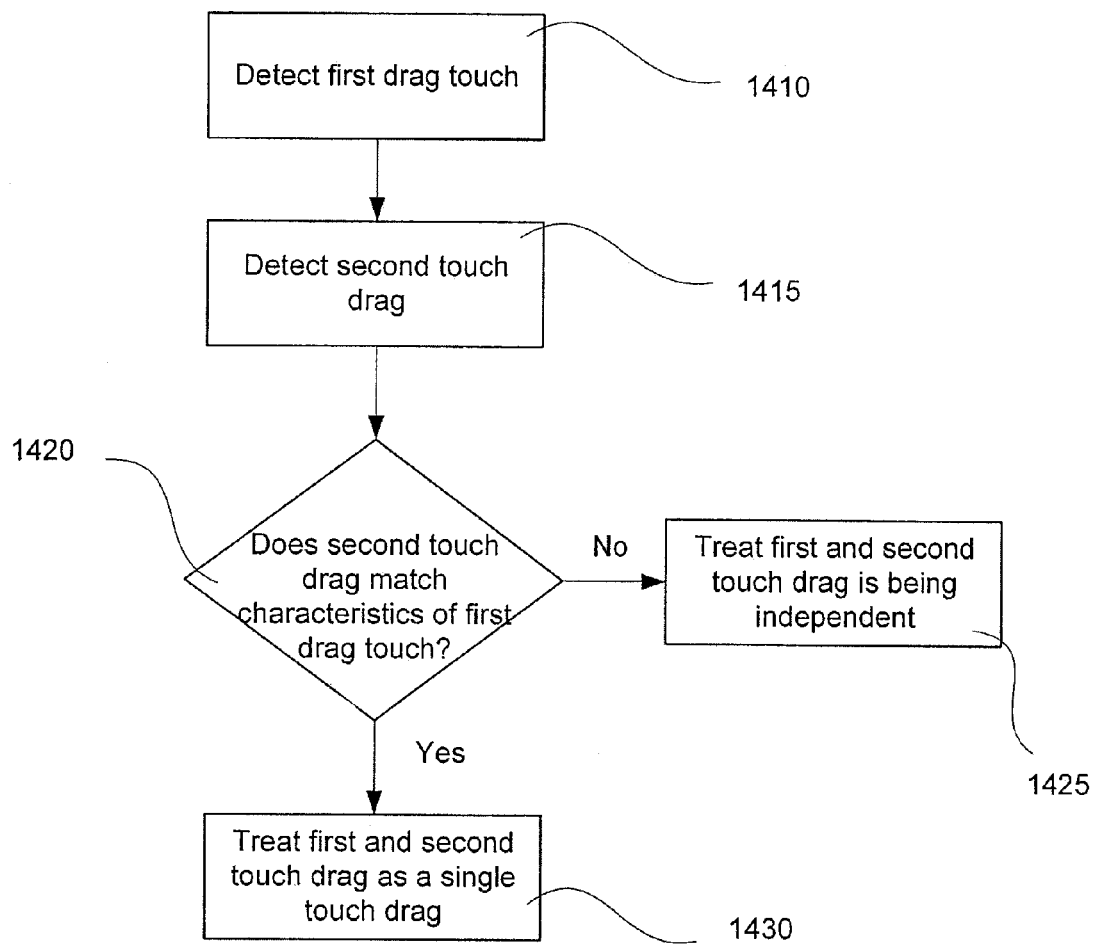
FIG. 14 illustrates an exemplary method of processing the drag inputs that may be used in accordance with at least one aspect of the present invention.

FIG. 14 illustrates a method of evaluating two drag inputs to see whether they were intended to be a single drag input. First in step 1410 a first drag input is received. Next in step 1415 a second drag input is received. In step 1420, it is determined whether the second drag input corresponds to an extension of the first drag input. This may be done by comparing the characteristics of the second drag input to the characteristics of the first drag input in a manner as discussed above. If the second drag input does not correspond to an extension of the first drag input, then in step 1425 the second drag input is treated as a distinct drag input. If, however, the characteristics of the second drag input do correspond to what is expected if the first drag input were to have continued, then in step 1430 the first and second drag inputs are treated as a single drag input.

It should be noted that with regard to the methods disclosed above, additional steps may be added and one or more depicted steps may be omitted without departing from various aspects of the present invention. Thus one or more of the method may be combined as is appropriate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. In a computer system having a graphical user interface including a touch-sensitive display, a method of controlling the display of a user interface element on the touch-sensitive display, comprising:
   (a) displaying a user interface element on the touch-sensitive display in a topmost position, wherein the user interface element is a cursor control element that is configured to manipulate a graphical cursor that is displayed on the touch sensitive display in response to user manipulation of the user interface element;
   (b) determining that the user interface element has been shifted from the topmost position;
   (c) adjusting the display of the user interface element in response to the shift based on a determination to display one of the user interface element or an application on the topmost position.

2. The method of claim 1, wherein the determining in (b) comprises:
   (i) checking if the user interface element is in the topmost position; and
   (ii) if the user interface element is not in the topmost position, determining an application that is in the top position.

3. The method of claim 2, wherein the adjusting in (c) comprises:
   (i) repositioning the user interface element in the topmost position a predetermined number of times; and
   (ii) if the user interface element has been shifted from the topmost position more than the predetermined number of times, leaving the user interface element in the non-topmost position.

4. The method of claim 1, wherein the adjusting in (c) comprises:
   (i) repositioning the user interface element in the topmost position a predetermined number of times; and
   (ii) if the user interface element has been shifted from the topmost position more than the predetermined number of times, leaving the user interface element in the non-topmost position.

5. The method of claim 1, wherein the user interface element is shifted by an application and the adjusting in (c) comprises:
   (i) determining whether the application should be granted the topmost position; and
   (ii) if the application should be granted the topmost position, setting the display of the user interface element so as to not interfere with the application.

6. The method of claim 1, wherein the user interface element is shifted by an application and the adjusting in (c) comprises:
   (i) moving the user interface element to the topmost position and the application to a position immediately below the topmost position;
   (ii) configuring the user interface element so that it is substantially transparent; and
   (iii) notifying the application that there is no need to move to the topmost position.

7. The method of claim 1, wherein the adjusting in (c) comprises:
   (i) moving the user interface element to the topmost position for a period of time; and
   (ii) after the period of time, not moving the user interface element to a topmost position.

8. A computer-readable storage medium storing computer-executable instructions that are executable by a computer for performing the steps recited in claim 1.

9. In a computer system having a graphical user interface including a touch-sensitive display, a method of controlling the display of a user interface element on the touch-sensitive display, comprising:
   (a) displaying a user interface element on the touch-sensitive display, wherein the user interface element is a cursor control element that is configured to manipulate a graphical cursor that is displayed on the touch sensitive display in response to user manipulation of the user interface element;
   (b) receiving an input from a user; and
   (c) determining to display one of the user interface element or another image on a topmost position based on a method to control the display.

10. The method of claim 9, wherein the input is provided by an input device other than the touch sensitive display and the determining in (c) comprises:
    (i) causing the user interface element to disappear.

11. The method of claim 10, wherein the causing in (i) comprises:
    (1) turning off the display of the user interface element.

12. The method of claim 9, wherein the input is provided by an input device other than the touch sensitive display and the determining in (c) comprises:
    (i) configuring the user interface element to be at least partially transparent.

13. The method of claim 9, wherein the input is provided by an application in response to a user requested change in a mode of the application.

14. The method of claim 9, wherein the input is a change in a transparency setting for the user interface element.

15. A computer-readable storage medium storing computer-executable instructions that are executable by a computer for performing the steps recited in claim 9.

16. The method of claim 9, wherein the user interface element is displayed in a region of the touch-sensitive display that surrounds the displayed graphical cursor.

17. The method of claim 9, wherein the user interface element is displayed in a region of the touch-sensitive display that is adjacent to the displayed graphical cursor.

18. The method of claim 9, wherein the user interface element rotates in orientation as the displayed graphical cursor is moved towards an edge of the touch sensitive display.

19. A system, comprising:

a touch-sensitive display; and a computing system to control display of a graphical user interface on the touch-sensitive display that allows user interaction with the computing system or applications executed by the computing system, wherein the graphical user interface is controlled to (i) display a user interface element on the touch-sensitive display, wherein the user interface element is a cursor control element that is configured to manipulate a graphical cursor that is displayed on the touch sensitive display in response to user manipulation of the user interface element, and to (ii) determine to display one of the user interface element or another image on a topmost position based on a method to control the display.

* * * * *